US011599073B2

(12) United States Patent
Koyama et al.

(10) Patent No.: US 11,599,073 B2
(45) Date of Patent: Mar. 7, 2023

(54) OPTIMIZATION APPARATUS AND CONTROL METHOD FOR OPTIMIZATION APPARATUS USING ISING MODELS

(71) Applicant: FUJITSU LIMITED, Kawasaki (JP)

(72) Inventors: Jumpei Koyama, Setagaya (JP); Kazuya Takemoto, Sagamihara (JP); Motomu Takatsu, Shinjuku (JP); Satoshi Matsubara, Machida (JP); Takayuki Shibasaki, Kawasaki (JP); Noboru Yoneoka, Kawasaki (JP); Toshiyuki Miyazawa, Kawasaki (JP); Akihiko Ohwada, Toshima (JP); Sanroku Tsukamoto, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 1047 days.

(21) Appl. No.: 16/284,101

(22) Filed: Feb. 25, 2019

(65) Prior Publication Data
US 2019/0286077 A1 Sep. 19, 2019

(30) Foreign Application Priority Data
Mar. 16, 2018 (JP) .............................. JP2018-049467

(51) Int. Cl.
G05B 13/04 (2006.01)
G06N 3/08 (2006.01)
(Continued)

(52) U.S. Cl.
CPC ............ G05B 13/042 (2013.01); G06F 17/11 (2013.01); G06N 3/0472 (2013.01); G06N 3/08 (2013.01); G06F 7/588 (2013.01)

(58) Field of Classification Search
CPC ....... G05B 13/042; G06F 17/11; G06F 7/588; G06N 3/0472; G06N 3/08; G06N 5/003; G06N 7/005
See application file for complete search history.

(56) References Cited

U.S. PATENT DOCUMENTS 9,881,256 B2 * 1/2018 Hamze .................. G06N 10/00
2003/0169041 A1 9/2003 Coury et al.
(Continued)

FOREIGN PATENT DOCUMENTS

JP 2016-103282 6/2016
JP 2017-219948 12/2017

OTHER PUBLICATIONS

Japanese Platform for Patent Information English abstract for Japanese Patent Publication No. 2016-103282, published Jun. 2, 2016.
(Continued)

Primary Examiner — Steven W Crabb
(74) Attorney, Agent, or Firm — Staas & Halsey LLP

(57) ABSTRACT

A problem is inputted into an operation unit. A computation unit searches for a ground state of an Ising model. A management unit converts the problem inputted from the operation unit to the Ising model, inputs the Ising model produced by conversion and initial operating conditions into the computation unit, and has the computation unit search for the ground state using overall operating conditions produced by changing the initial operating conditions based on a result of the computation unit searching for the ground state using the initial operating conditions.

15 Claims, 9 Drawing Sheets

(51) Int. Cl.
*G06F 17/11* (2006.01)
*G06N 3/04* (2006.01)
*G06F 7/58* (2006.01)

(56) References Cited

U.S. PATENT DOCUMENTS

2016/0063391 A1* 3/2016 Hayashi .................. G06F 7/588
 706/11
2016/0118106 A1* 4/2016 Yoshimura ............... G11C 7/04
 365/156
2017/0351947 A1 12/2017 Tamura et al.

OTHER PUBLICATIONS

Japanese Platform for Patent Information English abstract for Japanese Patent Publication No. 2017-219948, published Dec. 14, 2017.
Roman Martoňák et al., "Quantum annealing of the Traveling Salesman Problem", arXiv:cond-mat/0402330v1 [cond-mat.dis-nn], Feb. 12, 2004, pp. 1-5.
Sebastian Feld et al., "Solving the Travelling Salesman Problem Using Quantum Computing", OpenMunich, Dec. 1, 2017, pp. 1-59.

* cited by examiner

OPTIMIZATION APPARATUS AND CONTROL METHOD FOR OPTIMIZATION APPARATUS USING ISING MODELS

CROSS-REFERENCE TO RELATED APPLICATION

This application is based upon and claims the benefit of priority of the prior Japanese Patent Application No. 2018-049467, filed on Mar. 16, 2018, the entire contents of which are incorporated herein by reference.

FIELD

The embodiments discussed herein are related to an optimization apparatus and a control method for an optimization apparatus.

BACKGROUND

One way to solve multivariable optimization problems that are difficult for von Neumann-type computers is to use an optimization apparatus, sometimes referred to as an "Ising machine" or a "Boltzmann machine", that utilizes an Ising energy function. An optimization apparatus performs calculation by replacing the problem to be calculated with an Ising model, which is a model representing the spin behavior of magnetic materials.

An optimization apparatus performs modelling using a neural network, for example. When doing so, each unit (bit) included in the optimization apparatus functions as a neuron that output zero or one in keeping with the states of other bits and a weight coefficient, sometimes called a "connection coefficient", indicating the strength of the connection between the present bit and other bits. As one example, by using a stochastic search method such as simulated annealing, an optimization apparatus finds a solution that is a combination, or "ground state", of the states of bits where a minimum value of an energy function like those mentioned above (also referred to as a "cost function" or "objective function") is obtained.

Note that calculation of an optimization problem involves the setting of operating conditions of the optimization apparatus (see, for example, Japanese Laid-open Patent Publication No. 2016-103282 and US Patent Application Publication No. 2003/0169241).

However, the optimal operating conditions of an optimization apparatus will vary according to the type of problem to be calculated, which makes it difficult to set appropriate operating conditions for a problem based on a user input.

SUMMARY

According to an aspect, there is provided an optimization apparatus including: an operation unit into which a problem is inputted; a computation unit that searches for a ground state of an Ising model; and a management unit that converts the problem inputted from the operation unit to the Ising model, inputs the Ising model and initial operating conditions into the computation unit, and causes the computation unit to search for the ground state using overall operating conditions produced by changing the initial operating conditions based on a result of the computation unit searching for the ground state using the initial operating conditions.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings.

First Embodiment

An optimization apparatus described below calculates an optimization problem, such as the travelling salesman problem, by searching for a ground state of an Ising model (that is, the values of neurons at which an Ising energy function reaches a minimum). As one example, an Ising energy function $E(x)$ is defined in Expression (1) below.

$$E(x) = -\sum_{\langle i,j \rangle} W_{ij} x_i x_j - \sum_i b_i x_i \quad (1)$$

The first term on the right side is a sum of the products of two neuron values, which are each one or zero, and a weight coefficient, for every pair of two neurons that can be selected without omission or duplication from a set including every neuron (that is, every bit). In Expression (1), $x_i$ is the value of the $i^{th}$ neuron, $x_j$ is the value of the $j^{th}$ neuron, and $W_{ij}$ is a weight coefficient indicating the connection strength between the $i^{th}$ and $j^{th}$ neurons. Note that $W_{ij}=W_{ji}$ and $W_{ii}=0$.

The second term on the right side is a sum of products of a bias of each neuron and the value of that neuron. In Expression (1), $b_i$ is the bias of the $i^{th}$ neuron.

The energy increment $\Delta E_i$ that accompanies spin inversion (that is, a change in value) of the $i^{th}$ neuron is expressed by Expression (2) below.

$$\Delta E_i = (2x_i - 1) \cdot \left( \sum_j W_{ij} x_j + b_i \right) \quad (2)$$

In Expression (2), when the value $x_i$ of the $i^{th}$ neuron is 1, $(2x_i-1)$ gives 1, and when the value $x_i$ is 0, $(2x_i-1)$ gives −1. Note that $h_i$ expressed in Expression (3) below is referred to as a "local field" and a value produced by multiplying the local field $h_i$ by a sign ("+1" or "−1") in keeping with the value $x_i$ is an energy increment $\Delta E_i$.

$$h_i = \sum_j W_{ij} x_j + b_i \qquad (3)$$

Figure 1:
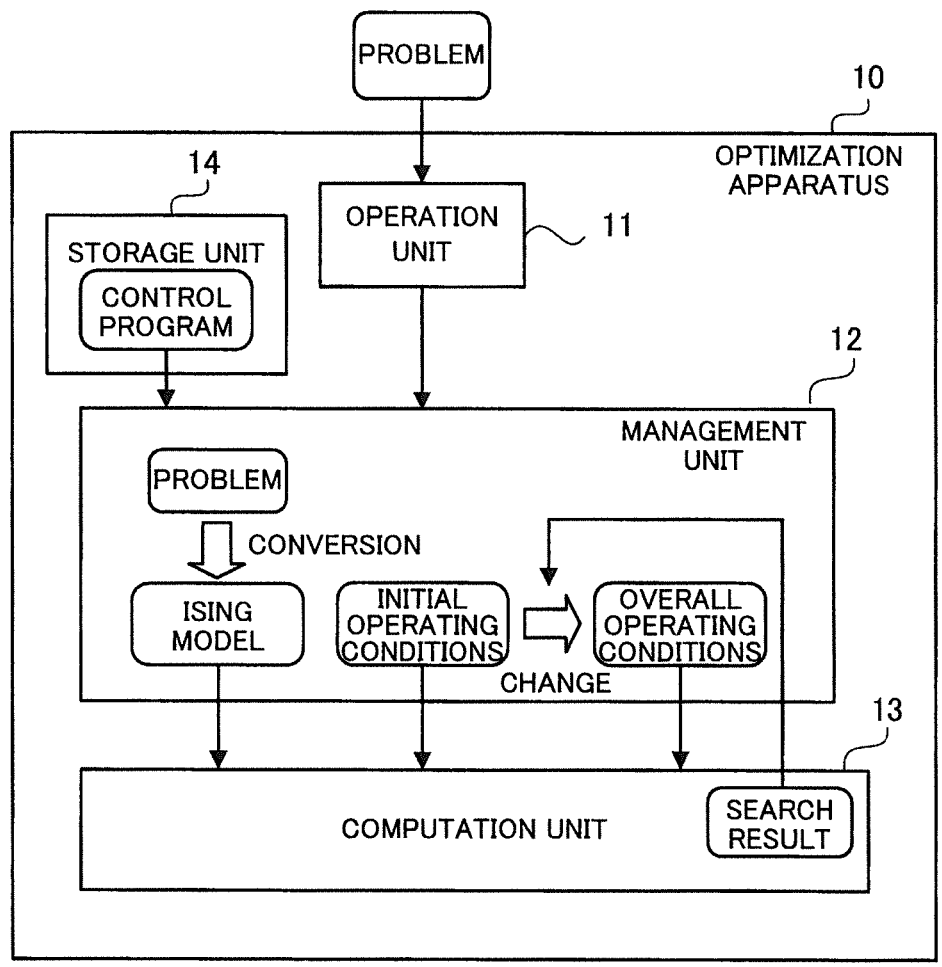
FIG. 1 depicts an example of an optimization apparatus according to the first embodiment and a control method for the optimization apparatus.

FIG. 1 depicts an example of an optimization apparatus according to the first embodiment and a control method for an optimization apparatus.

The optimization apparatus 10 includes an operation unit 11, a management unit 12, a computation unit 13, and a storage unit 14.

A problem to be calculated is inputted into the operation unit 11. As one example, the operation unit 11 is connected to an input device, not depicted, and the problem is inputted by the user operating the input device.

The management unit 12 replaces the problem inputted from the operation unit 11 with an Ising model. As one example, the management unit 12 converts the problem to an Ising model by calculating the weight coefficient $W_{ij}$ and the bias $b_i$ of the Ising energy function $E(x)$ defined in Expression (1) in keeping with the problem.

The management unit 12 also inputs the converted Ising model and initial operating conditions into the computation unit 13. When the computation unit 13 performs simulated annealing for example, the initial operating conditions are an initial temperature, a final temperature, and a cooling schedule (a cooling rate and the like) for the dropping temperature, the number of iterations of computation processing, the initial value of the value $x_i$, and the like. Note that during simulated annealing, temperature is expressed as a noise width. The higher the temperature, the greater the noise width. Noise is generated by a random number generator, such as an LFSR (Linear Feedback Shift Register).

The management unit 12 also inputs "overall operating conditions", which are produced by changing the initial operating conditions based on the result of the computation unit 13 searching for a ground state of the Ising model using the initial operating conditions, into the computation unit 13 and has the computation unit 13 search for a ground state using the inputted overall operating conditions.

As one example, the processing of the management unit 12 described above is performed by the management unit 12 executing a control program stored in the storage unit 14.

As examples, the management unit 12 is a processor as a computational processing device, such as a CPU (Central Processing Unit) or a DSP (Digital Signal Processor). The management unit 12 may include an electronic circuit for a dedicated application, such as an ASIC (Application Specific Integrated Circuit) or an FPGA (Field Programmable Gate Array). Note that a group of a plurality of processors may be referred to as a "multiprocessor" or simply as a "processor".

Note that the operation unit 11 and the management unit 12 may be realized by a single computer.

The computation unit 13 searches for a ground state of an Ising model using the inputted initial operating conditions or the overall operating conditions. The computation unit 13 searches for the ground state of the Ising model by way of a stochastic search.

As one example, the computation unit 13 first computes the local field $h_i$ expressed by Expression (3) based on the weight coefficient $W_{ij}$, the bias $b_i$, and the value $x_i$. The computation unit 13 then adds a noise value (a random number), whose noise width corresponds to a temperature indicated by the initial operating conditions or the overall operating conditions, to the local field $h_i$ and determines whether to update the value of the $i^{th}$ neuron according to a comparison with a threshold. The computation unit 13 updates or maintains the value of the $i^{th}$ neuron based on the result of this determination. The computation unit 13 repeats the computation processing described above for a predetermined number of iterations. Note that when simulated annealing is performed, the computation unit 13 lowers the temperature (that is, reduces the noise width) in each iteration of the repeated processing before the predetermined number of iterations is reached, based on a cooling schedule indicated by the initial operating conditions or the overall operating conditions. The computation unit 13 calculates the value of the energy function $E(x)$ indicated in Expression (1), hereinafter simply referred to as the "energy", after the predetermined number of iterations of the repeated processing. The calculated energy and the value of each neuron are supplied to the management unit 12 as the search result.

As examples, the computation unit 13 described above may be realized using registers that hold the weight coefficient $W_{ij}$, the bias $b_i$, and the value $x_i$, a sum of products computing circuit, a random number generator (such as an LFSR), a comparator, and logic circuits such as selectors.

As examples, the storage unit 14 stores a control program of the optimization apparatus 10, the initial operating conditions, the overall operating conditions, and the like. As the storage unit 14, it is possible to use a volatile memory such as RAM (Random Access Memory), a nonvolatile memory such as flash memory or EEPROM (Electrically Erasable Programmable Read Only Memory), or a hard disk drive (HDD).

An example operation of the optimization apparatus 10 according to the first embodiment will now be described.

When the problem to be calculated has been inputted into the operation unit 11, the management unit 12 converts the problem to an Ising model and inputs the Ising model together with the initial operating conditions into the computation unit 13. Note that the management unit 12 may input the initial operating conditions into the computation unit 13 in advance.

The computation unit 13 uses the initial operating conditions to search for the ground state of the Ising model. The management unit 12 inputs the overall operating conditions, which have been produced by changing the initial operating conditions based on a search result of the computation unit 13, into the computation unit 13. As examples, the management unit 12 updates the initial operating conditions to the overall operating conditions when the energy is equal to or above the threshold after a predetermined number of iterations of the repeated processing and/or when, after the predetermined number of iterations of the repeated processing have been performed a plurality of times, the variation in the energy after each iteration of the repeated processing is larger than a predetermined value.

In the overall operating conditions, as examples, the initial temperature, the final temperature, the cooling schedule, the number of iterations of the computation processing, or the initial value of the value $x_i$ differ from the initial operating conditions.

The computation unit 13 uses the overall operating conditions to search for the ground state of the Ising model in the same way as described above. The management unit 12 may update the overall operating conditions based on the result of a search performed by the computation unit 13 using the overall operating conditions, input the updated overall operating conditions into the computation unit 13, and have the computation unit 13 perform another search.

As one example, when the energy after a predetermined number of iterations of the repeated processing is below a threshold or when, after the predetermined number of iterations of the repeated processing have been performed a plurality of times, the variation in the energy after each iteration of the repeated processing is smaller than a predetermined value, the management unit 12 outputs the values of the neurons at this time as the solution. Alternatively, the management unit 12 may output the values of the neurons a predetermined time from the start of calculation as the solution.

According to the optimization apparatus 10 described above, since the management unit 12 changes the operating conditions from the initial operating conditions to the overall operating conditions based on the search result of the computation unit 13, it is possible to automatically set appropriate operating conditions for the problem. It is therefore sufficient for the user to input the problem to be calculated into the operation unit 11 and unnecessary to set the operating conditions. By doing so, it is possible to obtain a solution of a certain standard or higher irrespective of the user's experience.

Second Embodiment

An optimization apparatus according to a second embodiment realizes an exchange Monte Carlo method (also referred to as a "replica exchange method" or "extended ensemble method").

The exchange Monte Carlo method performs a stochastic search using a plurality of networks with different temperatures (hereinafter referred to as "replicas") and interchanges ("exchanges") the states of nodes between replicas that have been set adjacent temperatures in keeping with the difference in energy between the replicas. Note that the "state" of a node corresponds to the values of the neurons described earlier.

By using this method, a situation where the solution becomes stuck at a local solution is avoided, and it is possible to have the solution converge on the optimal solution at higher speed. Note that the same effect is obtained when the temperatures of the replicas are exchanged instead of exchanging the states of nodes in the replicas.

Figure 2:
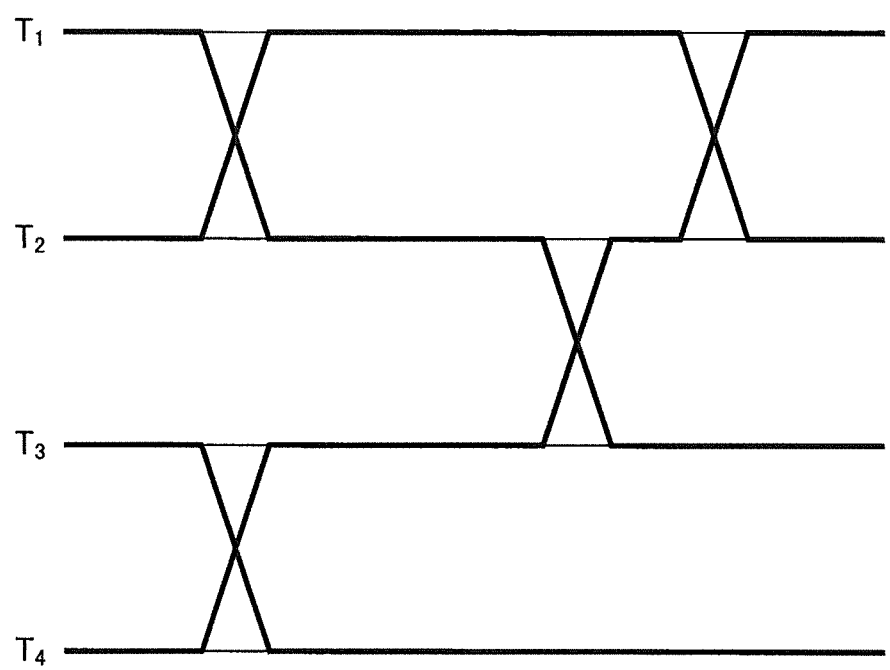
FIG. 2 depicts how the states of nodes in a plurality of replicas that have been set different temperatures are exchanged.

FIG. 2 depicts how the states of nodes in a plurality of replicas that have been set different temperatures are exchanged.

As one example, FIG. 2 assumes a plurality of (that is, four) replicas have been provided and that the temperatures of the replicas are $T_1$ to $T_4$, where $T_4 > T_3 > T_2 > T_1$. According to the exchange Monte Carlo method, the states of nodes (or temperatures) are exchanged between replicas that have been set adjacent temperatures with a predetermined exchange probability. The exchange probability is expressed as min(1,R), where R is expressed by Expression (4) below.

$$R = \exp\{(1/T_q - 1/T_{q+1})(E_{total}(X_q) - E_{total}(X_{q+1}))\} \quad (4)$$

Note that in Expression (4), $T_q$ and $T_{q+1}$ are the respective temperatures of the $q^{th}$ replica and the $q+1^{th}$ replica that have been set adjacent temperatures. $E_{total}(X_q)$ and $E_{total}(X_{q+1})$ are the respective total energies of these two replicas. $X_q$ and $X_{q+1}$ are assumed to respectively include all of the states of the nodes in the $q^{th}$ and the $q+1^{th}$ replicas.

With the exchange probability defined in this way, since R will exceed 1 when $T_q < T_{q+1}$ and $E_{total}(X_q) > E_{total}(X_{q+1})$ according to Expression (4), the exchange probability will be 1 so that the states of nodes will be exchanged. As one example, for the replica whose temperature is $T_1$ and the replica whose temperature is $T_2$, when the energy of the replica whose temperature is $T_2$ is lower than the energy of the replica whose temperature is $T_1$, the exchanging of the states of nodes is performed.

On the other hand, when $T_q < T_{q+1}$ and $E_{total}(X_q) < E_{total}(X_{q+1})$, the exchanging of the states of nodes is performed with the probability R.

As one example, for the replica whose temperature is $T_1$ and the replica whose temperature is $T_2$, when the energy of the replica whose temperature is $T_2$ is higher than the energy of the replica whose temperature is $T_1$, the exchanging of the states of nodes is performed with the probability R.

Figure 3:
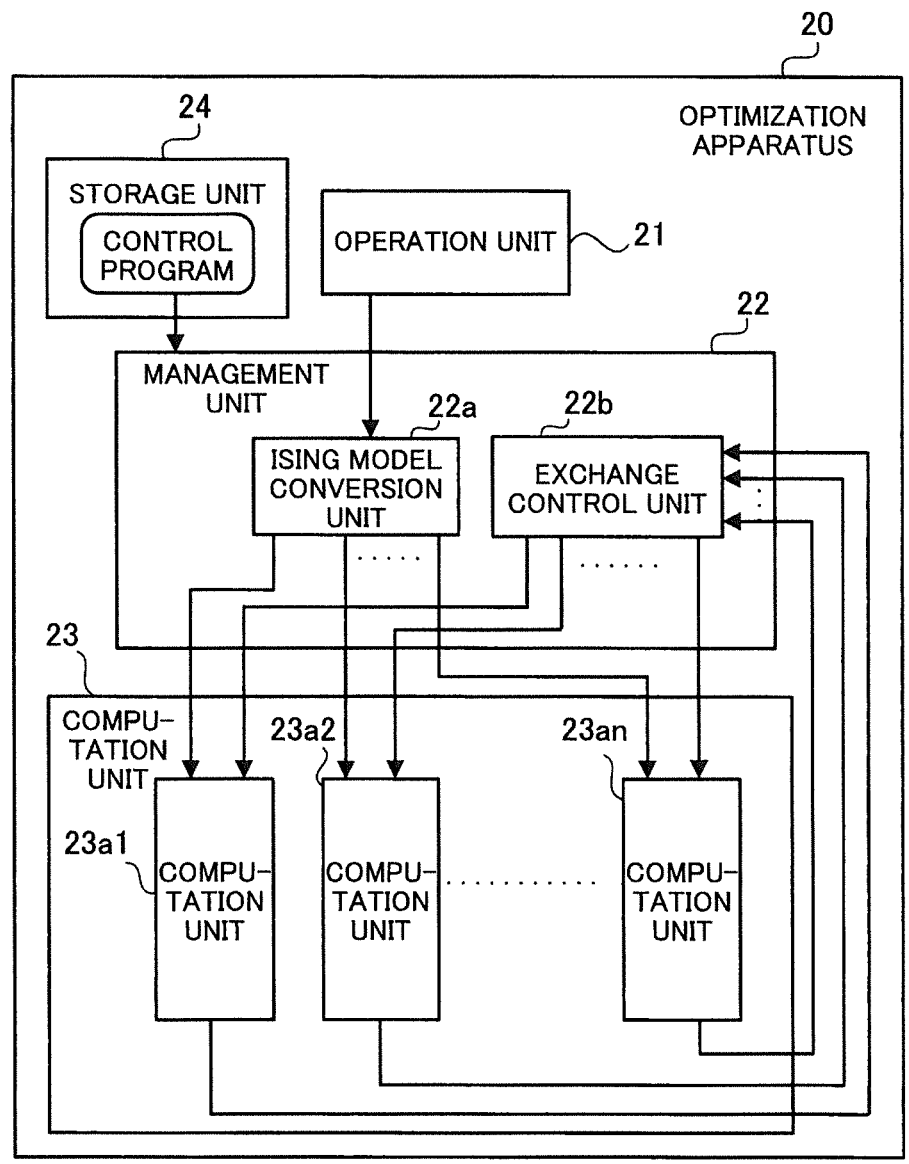
FIG. 3 depicts an example of an optimization apparatus according to a second embodiment that realizes the exchange Monte Carlo method.

FIG. 3 depicts an example of the optimization apparatus according to the second embodiment that realizes the exchange Monte Carlo method.

An optimization apparatus 20 includes an operation unit 21, a management unit 22, a computation unit 23 including computation units 23a1, 23a2, . . . , 23an, and a storage unit 24.

The operation unit 21 is the same as the operation unit 11 of the optimization apparatus 10 according to the first embodiment.

The management unit 22 includes an Ising model conversion unit 22a and an exchange control unit 22b.

The Ising model conversion unit 22a converts a problem to an Ising model by calculating the weight coefficient $W_{ij}$ and the bias $b_i$ of the Ising energy function E(x) defined in Expression (1) in keeping with the problem.

As one example, for a travelling salesman problem, the weight coefficient $W_{ij}$ and the bias $b_i$ are decided so as to reflect the distances between cities and constraint conditions (that is, conditions for suppressing multiple visits to the same city, simultaneous visits to multiple cities, and the like).

The Ising model conversion unit 22a then inputs the Ising model (that is, the weight coefficient $W_{ij}$ and the bias $b_j$) into all of the computation units 23a1 to 23an. Note that to realize the exchange Monte Carlo method, the computation units 23a1 to 23an are each provided with the same Ising model.

The exchange control unit 22b inputs the initial operating conditions into all of the computation units 23a1 to 23an. The initial operating conditions of the respective computation units 23a1 to 23an are the initial temperatures (or initial values (initial states) of the neurons) to be set in each of the above replicas according to the exchange Monte Carlo method. The initial operating conditions for the computation unit 23 that includes the computation units 23a1 to 23an are a highest temperature, a lowest temperature, a temperature interval, the number of replicas, and the like. Note that the exchange control unit 22b may select the initial operating conditions to be used in keeping with the inputted problem out of a plurality of candidates for the initial operating conditions, or initial operating conditions that are decided in advance irrespective of the inputted problem may be inputted into the computation units 23a1 to 23an.

As one example, when the temperatures have been set so as to rise for the computation units 23a1 to 23an in that order, the highest temperature is set at the computation unit 23an and the lowest temperature is set at the computation unit 23a1. Note that the number of replicas corresponds to the number of computation units to be used out of the n computation units 23a1 to 23an.

The exchange control unit 22b also inputs "overall operating conditions", which are produced by changing the initial operating conditions based on the result of the computation units 23a1 to 23an searching for a ground state, into the computation units 23a1 to 23an.

As one example, the exchange control unit 22b receives the energy ($E_{total}(X_q)$ and $E_{total}(X_{q+1})$ in Expression (4) or the like) after a predetermined number of iterations of repeated processing at the computation units 23a1 to 23an. The exchange control unit 22b then changes the initial operating conditions so as to exchange the temperatures (or states) of pairs of computation units that have been set adjacent temperatures in keeping with the exchange probability min(1,R) described earlier. The exchange control unit 22b then inputs operating conditions obtained by changing the initial operating conditions, that is, the "overall operating conditions", into the computation units 23a1 to 23an.

The computation units 23a1 to 23an each search for a ground state of the inputted Ising model. As one example, the computation units 23a1 to 23an first compute the local field $h_i$ expressed by Expression (3) based on the weight coefficient $W_{ij}$, the bias $b_i$, and the value $x_i$. The computation units 23a1 to 23an then add a noise value, whose noise width corresponds to the temperature designated by the initial operating conditions or the overall operating conditions, to the local field $h_i$ and determine whether to update the value of the $i^{th}$ neuron based on a comparison with a threshold. In addition, the computation units 23a1 to 23an then each update or maintain the value of the $i^{th}$ neuron based on the result of this determination. The computation units 23a1 to 23an repeat this processing for a predetermined number of iterations. The computation units 23a1 to 23an also calculate the energy indicated in Expression (1) after a predetermined number of iterations of the repeated processing. The calculated energy and the values of the neurons are supplied to the management unit 22 as the search result.

In the same way as the computation unit 13 of the optimization apparatus 10 according to the first embodiment, the computation units 23a1 to 23an described above may each be realized using registers, a sum of products computing circuit, a random number generator, and logic circuits such as comparators and selectors.

As examples, the storage unit 24 stores a control program of the optimization apparatus 20, the initial operating conditions, the overall operating conditions, and the like. As the storage unit 24, it is possible to use a volatile memory such as RAM, a nonvolatile memory such as a flash memory or an EEPROM, or an HDD.

An example operation of the optimization apparatus 20 according to the second embodiment, which is realized by executing a control program stored in the storage unit 24, will now be described.

Figure 4:
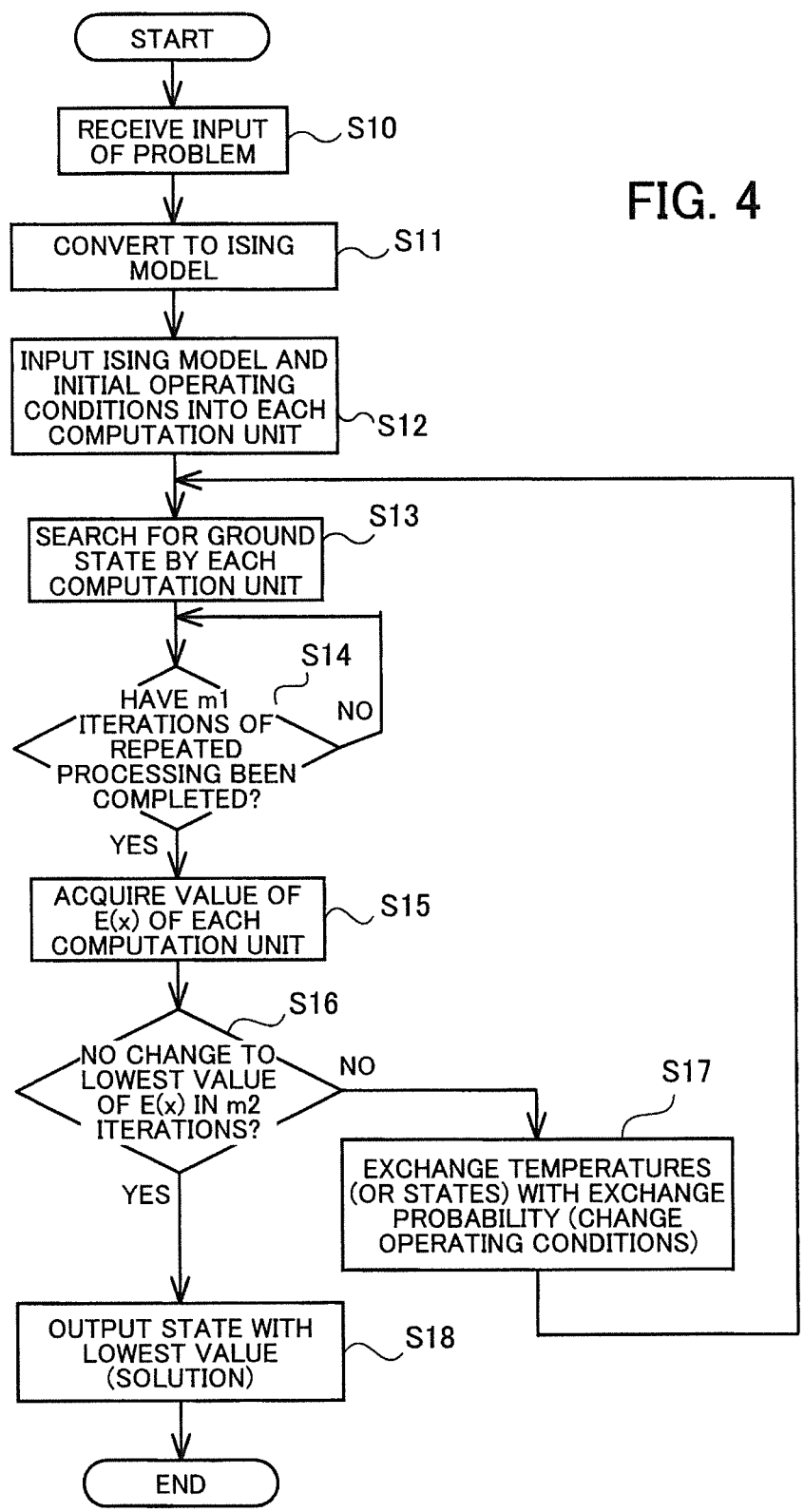
FIG. 4 is a flowchart depicting one example flow of operations of the optimization apparatus according to the second embodiment.

FIG. 4 is a flowchart depicting one example flow of operations of the optimization apparatus according to the second embodiment.

When the inputting of a problem by the user has been received by the operation unit 21 (step S10), the Ising model conversion unit 22a of the management unit 22 converts the problem to an Ising model (step S11). The Ising model conversion unit 22a then inputs the Ising model into each of the computation units 23a1 to 23an and the exchange control unit 22b inputs the initial operating conditions into each of the computation units 23a1 to 23an (step S12).

The management unit 22 has the computation units 23a1 to 23an search for a ground state of the Ising model using the initial operating conditions or the overall operating conditions, which are produced by changing the initial operating conditions in subsequent processing (step S13). The management unit 22 then determines whether the repeated processing performed in a search has been completed m1 times, which is a predetermined number of times (step S14). As one example, the management unit 22 counts the number of pulses of a clock used in operations of the computation units 23a1 to 23an and determines, based on the number of pulses taken by a series of processes that decides whether to update the value of a neuron, whether m1 iterations of the repeated processing have been completed. When it has been determined that m1 iterations of the repeated processing have not been completed, the determination processing in step S14 continues until m1 iterations of the repeated processing have been completed.

When it has been determined that m1 iterations of the repeated processing have been completed, the management unit 22 has the computation units 23a1 to 23an calculate the energy and acquires the energy values (step S15). Note that the management unit 22 may receive the values of the respective neurons as the search result and calculate the energy by itself based on the weight coefficient $W_{ij}$ and the bias $b_i$.

The management unit 22 then determines whether the lowest out of the respective energy values of the computation units 23a1 to 23an has not changed during m2 (a number decided in advance) iterations of the processing in step S15 described above (step S16).

When the lowest value has changed during the m2 iterations, the management unit 22 changes the initial operating conditions or the overall operating conditions by exchanging temperatures (or states) with the exchange probability (min (1,R)) described earlier at a pair of computation units that have been set adjacent temperatures (step S17). The management unit 22 then provides the computation units 23a1 to 23an with operating conditions obtained by changing the initial operating conditions or the overall operating conditions and has the search in step S13 executed again.

When the lowest value does not change during m2 iterations, the management unit 22 outputs the state (that is, the values of the neurons) of the computation unit that outputs the lowest value as the solution (step S18). As one example, the management unit 22 may display the solution on a display apparatus, not illustrated.

Note that the management unit 22 may change the initial operating conditions (such as the highest temperature, the lowest temperature, the temperature interval, the number of replicas, and the like) for the computation unit 23 based on search results. As one example, when the lowest value has not stopped changing during the last m2 iterations, even after the processing in step S15 has been performed for a number m3 (>m2) of iterations decided in advance, the management unit 22 has the computation units 23a1 to 23an perform a search using the overall operating conditions produced by changing the initial operating conditions for the computation unit 23. When the lowest value does not stop changing during the last m2 iterations even when the overall operating conditions are used, the management unit 22 may have the computation units 23a1 to 23an perform a search using yet another set of overall operating conditions.

According to the optimization apparatus 20 described above, since the management unit 22 changes the operating conditions from the initial operating conditions to the overall operating conditions based on the search results of the computation units 23a1 to 23an, it is possible to automatically set appropriate operating conditions in keeping with the problem. It is also sufficient for the user to input the problem to be calculated into the operation unit 21 and unnecessary to set the operating conditions. By doing so, it is possible to obtain a solution of a certain standard or higher irrespective of the user's experience.

Also, since the optimization apparatus 20 realizes the exchange Monte Carlo method, it is possible to avoid a situation where the solution becomes stuck at a local solution and instead have the solution converge on the optimal solution at higher speed.

Third Embodiment

Figure 5:
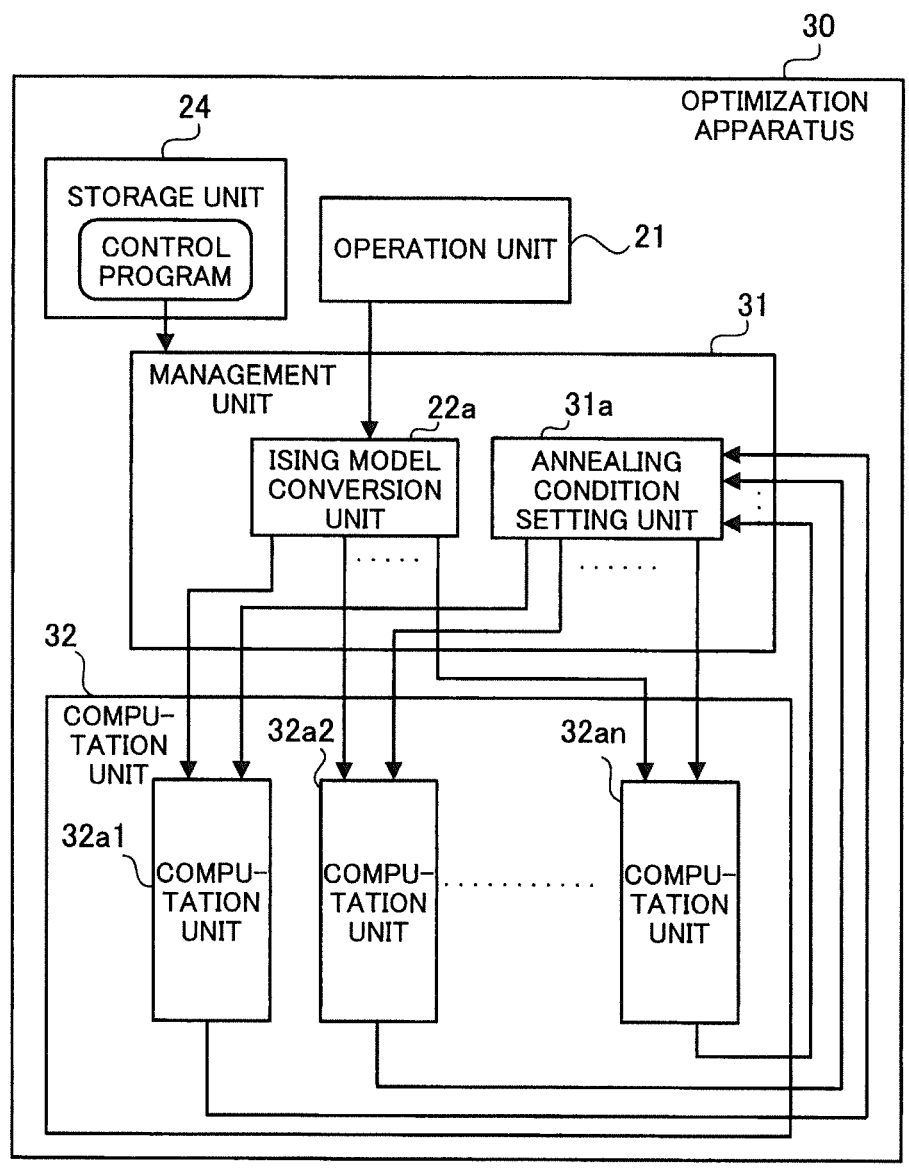
FIG. 5 depicts an example of an optimization apparatus according to a third embodiment.

FIG. 5 depicts an example of an optimization apparatus according to a third embodiment. In FIG. 5, elements that are the same as the optimization apparatus 20 according to the second embodiment depicted in FIG. 3 have been assigned the same reference numerals.

With an optimization apparatus 30 according to the third embodiment, an annealing condition setting unit 31a of a management unit 31 inputs annealing conditions and the like as the initial operating conditions or the overall operating conditions into computation units 32a1 to 32an. The annealing conditions include an initial temperature, a final temperature, and a cooling rate for the dropping temperature, the initial values of neurons, and the like. The annealing condition setting unit 31a inputs the annealing conditions into the computation units 32a1 to 32an so that the computation units 32a1 to 32an perform simulated annealing with respectively different annealing conditions.

The annealing condition setting unit 31a also changes the initial operating conditions or the overall operating conditions based on search results of the computation units 32a1 to 32an.

The computation units 32a1 to 32an included in a computation unit 32 have the same functions as the computation units 23a1 to 23an of the optimization apparatus 20 according to the second embodiment and perform simulated annealing based on the annealing conditions described above.

An example operation of the optimization apparatus 30 according to the third embodiment, which is realized by executing a control program stored in the storage unit 24, will now be described.

Figure 6:
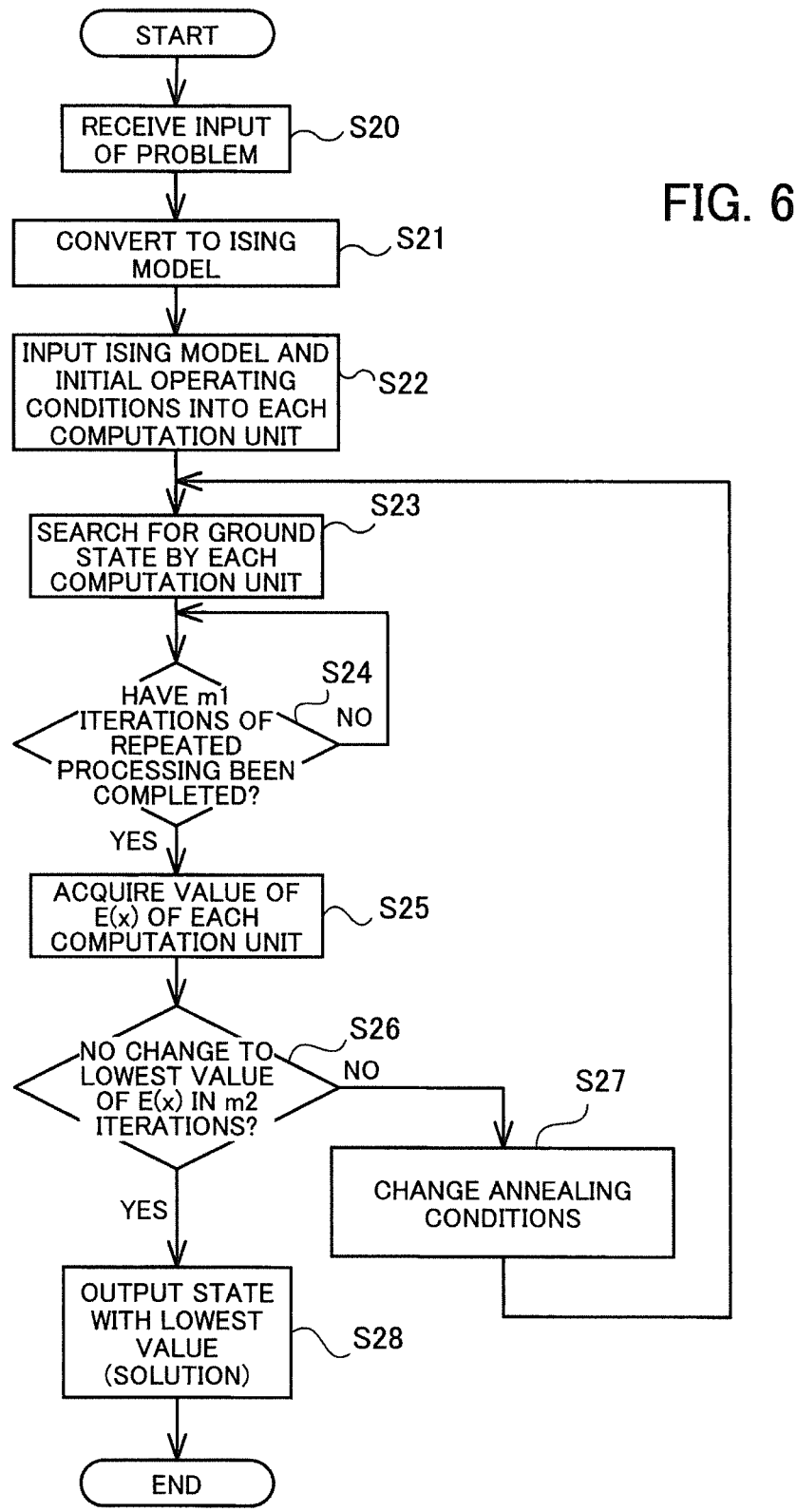
FIG. 6 is a flowchart depicting one example flow of operations of the optimization apparatus according to the third embodiment.

FIG. 6 is a flowchart depicting one example flow of operations of the optimization apparatus according to the third embodiment.

The processing in steps S20 to S22 is substantially the same as the processing in steps S10 to S12 executed by the optimization apparatus 20 according to the second embodiment. However, in the processing in step S22, the annealing condition setting unit 31a of the management unit 31 inputs the initial operating conditions, which include annealing conditions such as the cooling rate, into the computation units 32a1 to 32an.

The processing in steps S23 to S26 is also substantially the same as the processing in steps S13 to S16 executed by the optimization apparatus 20 according to the second embodiment. However, in the processing in step S23, the computation units 32a1 to 32an perform a search for the ground state of an Ising model by performing simulated annealing using respectively different annealing conditions.

When the lowest value changes during m2 iterations ("No" in step S26), the management unit 31 changes the annealing conditions included in the initial operating conditions or the overall operating conditions (step S27). The management unit 31 then provides the computation units 32a1 to 32an with operating conditions (or "overall operating conditions") obtained by changing the initial operating conditions or the overall operating conditions and has the computation units 32a1 to 32an execute the search in step S23 again.

The processing in step S28 is the same as the processing in step S18 by the optimization apparatus 20 according to the second embodiment.

Figure 7:
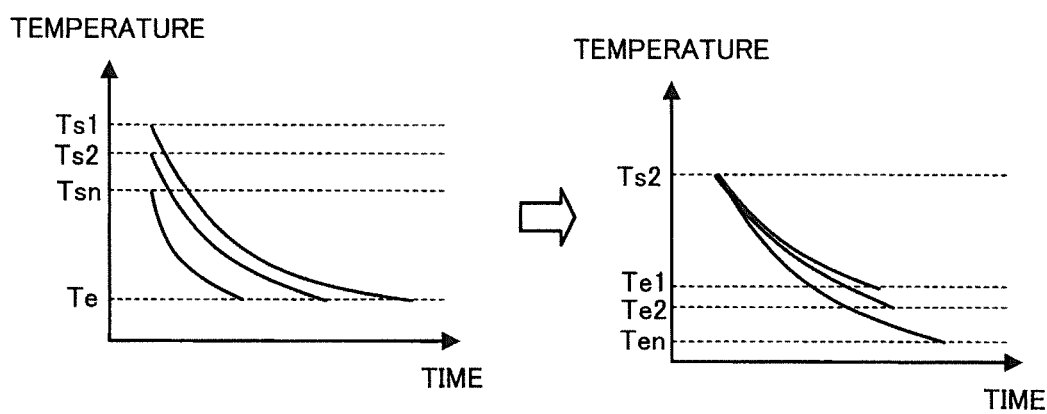
FIG. 7 depicts example changes to annealing conditions.

FIG. 7 depicts example changes to the annealing conditions.

The management unit 31 decides values of the various annealing conditions (as examples, the initial temperature and the final temperature) that produce the lowest energy in order. As one example, in the processing in step S22 described earlier, the management unit 31 first inputs a different initial temperature into the computation units 32a1 to 32an and inputs the same values for the other annealing conditions. As depicted in FIG. 7, the management unit 31 inputs the highest initial temperature Ts1 into the computation unit 32a1, inputs the next highest initial temperature Ts2 into the computation unit 32a2, and inputs the lowest initial temperature Tsn into the computation unit 32an. The final temperature Te inputted into the computation units 32a1 to 32an is the same.

Assume that when performing a search using the annealing conditions, the energy calculated by the computation unit 32a2 that uses the initial temperature Ts2 is lower than the energy value produced by other computation units. When this happens, in the processing in step S27, the management unit 31 changes the operating conditions so that the initial temperature Ts2 is provided to all of the computation units 32a1 to 32an and different final temperatures are provided to the computation units 32a1 to 32an.

As depicted in FIG. 7, as one example, the management unit 31 inputs the highest final temperature Te1 into the computation unit 32a1, inputs the next highest final temperature Te2 into the computation unit 32a2, and inputs the lowest final temperature Ten into the computation unit 32an. In the same way as above, the management unit 31 then decides which final temperature produces the lowest energy and has the computation units 32a1 to 32an perform a search using the final temperature decided in this way.

The management unit 31 successively decides the other annealing conditions in the same way, and as one example, outputs the state of the computation units (that is, the values of the neurons) where the energy becomes the lowest value, out of the computation units 32a1 to 32an that were assigned different values for the final annealing condition, as the solution.

With the optimization apparatus 30 described above, since the management unit 31 changes the operating conditions based on search results produced by the respective computation units 32a1 to 32an, the same effects as the optimization apparatus 20 according to the second embodiment are obtained.

Note that the management unit 31 may have searches according to various operating conditions executed in parallel by a plurality of computation units and output a state of a computation unit (that is, the values of neurons) where the energy is the lowest as a solution without changing the operating conditions. When doing so, since it is unnecessary to change the operating conditions, it is possible to reduce the calculation time, but to improve the precision of the solution, searches according to a large number of operating conditions are executed in parallel by a large number of computation units, resulting in an increase in the number of computation units. As described above, since the management unit 31 reduces the number of combinations of operating conditions that are used at any one time by changing the operating conditions based on the search results, it is possible to avoid an increase in the number of computation units, or in other words, to reduce the amount of hardware. Also, since the optimization apparatus 30 uses a plurality of computation units 32a1 to 32an, it is possible to suppress the number of changes to the operating conditions and suppress increases in the calculation time.

The management unit 31 may have one computation unit perform a search and change the operating conditions based on the search result of that computation unit. When doing so, although there is an increase in the time taken in changing the operating conditions, it is possible to reduce the number of computation units and thereby reduce the amount of hardware.

Fourth Embodiment

Figure 8:
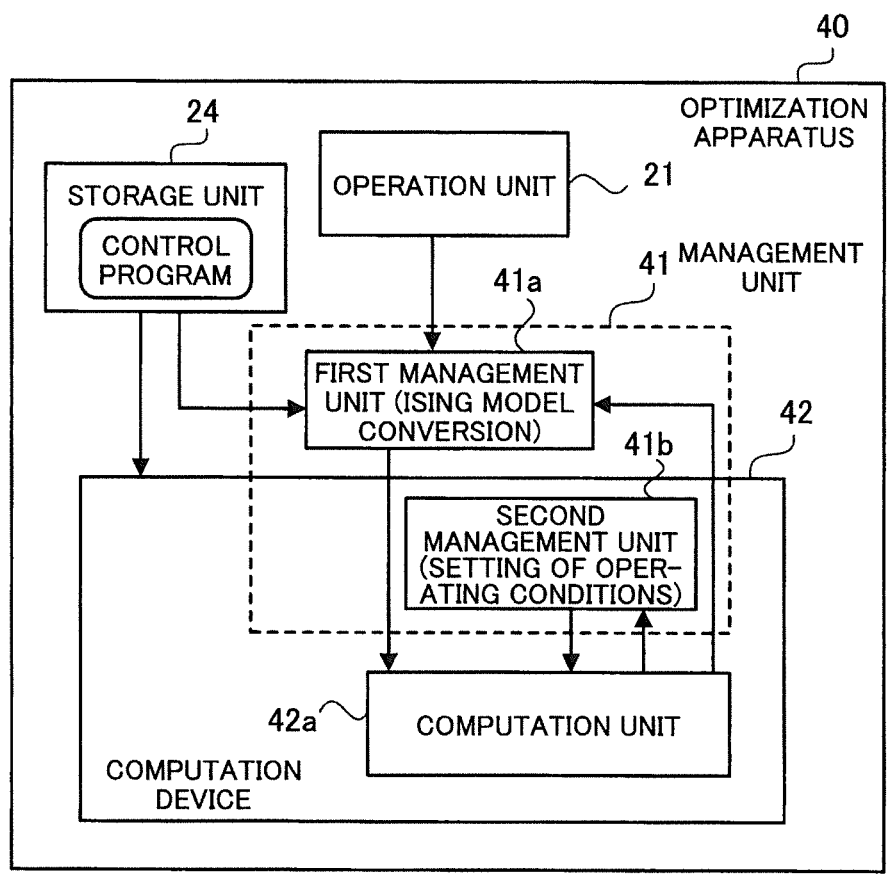
FIG. 8 depicts an example of an optimization apparatus according to a fourth embodiment.

FIG. 8 depicts an example of the optimization apparatus according to a fourth embodiment. In FIG. 8, elements that are the same as the optimization apparatus 20 according to the second embodiment depicted in FIG. 3 have been assigned the same reference numerals.

In an optimization apparatus 40 according to the fourth embodiment, some functions of a management unit 41 are provided in a computation device 42 equipped with a computation unit 42a. In the example in FIG. 8, the management unit 41 includes a first management unit 41a and a second management unit 41b, with the second management unit 41b being provided in the computation device 42.

The first management unit 41a converts a problem to an Ising model and outputs the solution obtained by a search by the computation unit 42a.

The second management unit 41b inputs the initial operating conditions into the computation unit 42a and changes the operating conditions (such as changing the initial operating conditions to the overall operating conditions) in keeping with search results. That is, in the same way as the exchange control unit 22b of the optimization apparatus 20 according to the second embodiment or the annealing condition setting unit 31a of the optimization apparatus 30 according to the third embodiment, the second management unit 41b has a function for setting (or changing) the operating conditions.

When the computation device 42 is an FPGA, as one example, the initial operating conditions or the overall operating conditions are supplied from the storage unit 24 to the FPGA together with the circuit configuration data of the FPGA so as to construct circuits for realizing the functions of the second management unit 41b and the computation unit 42a. When the apparatus that realizes the computation device 42 is an ASIC, it is possible to realize fixed logic using a ROM, pull-ups/pull-downs, and the like and to set the initial operating conditions and/or overall operating conditions in advance.

The computation unit 42a has the same functions as the computation unit 23 of the optimization apparatus 20 according to the second embodiment or the computation unit 32 of the optimization apparatus 30 according to the third embodiment.

With the optimization apparatus 40 described above, the same effects as the optimization apparatuses 20 and 30 according to the second and third embodiments are obtained, and since it is possible to change the operating conditions by hardware inside the computation device 42, it is possible to reduce the time taken in changing the conditions and reduce the calculation time.

Note that when the computation device 42 has sufficient performance, it is possible to also implement functions such as converting the problem to an Ising model in the computation device 42.

Also, instead of inputting a problem, it is possible to have the user input an Ising model produced by converting a problem into the operation units 11 and 21 in the embodiments described above. In this case, the management units 12, 22, 31, and 41 do not need to convert the problem to an Ising model. However, it is more convenient to have the management units 12, 22, 31, and 41 convert the problem to an Ising model since it is then sufficient for the user to merely input a problem.

The functions of the operation units 11 and 21, the management units 12, 22, and 31 and the first management unit 41a of the embodiments described above may be realized by a computer that operates according to a control program. Example hardware of the computer is described below.

Example Hardware of a Computer

Figure 9:
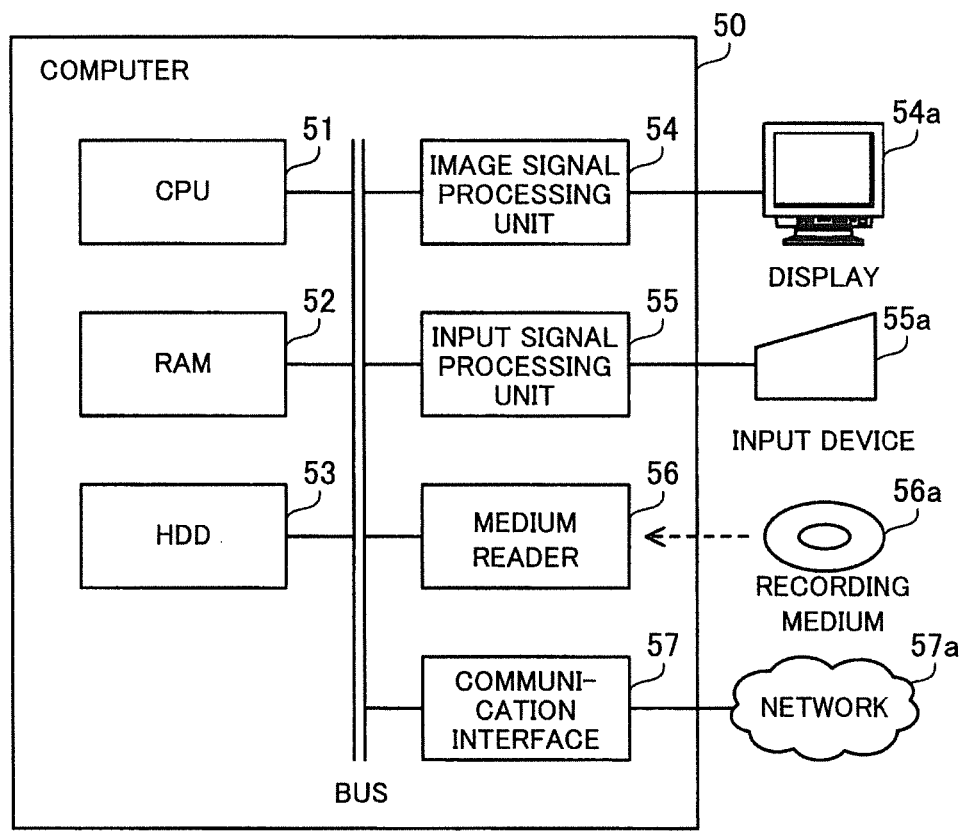
FIG. 9 depicts example hardware of a computer.

FIG. 9 depicts example hardware of a computer.

A computer 50 includes a CPU 51, a RAM 52, an HDD 53, an image signal processing unit 54, an input signal processing unit 55, a medium reader 56, and a communication interface 57. These units are connected to a bus.

The CPU 51 is a processor including an arithmetic circuit that executes instructions of a program. The CPU 51 loads at least a part of the program (for example, the control program mentioned earlier) and data that are stored in the HDD 53 into the RAM 52 and executes the program. Note that the CPU 51 may include a plurality of processor cores, the computer 50 may include a plurality of processors, and the processing mentioned earlier may be executed in parallel using a plurality of processors or a plurality of processor cores.

The RAM 52 is a volatile semiconductor memory that temporarily stores the program to be executed by the CPU 51 and/or data to be used in computation by the CPU 51. Note that the computer 50 may be equipped with a type of memory aside from RAM, and may include a plurality of memories.

The HDD 53 is a nonvolatile storage apparatus that stores software programs, such as an OS (Operating System), middleware, and application software, and data. Here, as examples, the "programs" include a control program that causes the computer 50 to execute the operations of the management units 12, 22, 31, and the first management unit 41a described earlier. Note that the computer 50 may include other types of storage apparatus, such as flash memory and SSDs (Solid State Drives), and may include a plurality of nonvolatile storage apparatuses.

The image signal processing unit 54 outputs an image (for example, an image expressing the calculation result of an optimization problem) to a display 54a connected to the computer 50 in accordance with instructions from the CPU 51. As the display 54a, it is possible to use a CRT (Cathode Ray Tube) display, an LCD (Liquid Crystal Display), a PDP (Plasma Display Panel), an OEL (Organic Electro-Luminescence) display, or the like.

The input signal processing unit 55 acquires an input signal from an input device 55a connected to the computer 50 and outputs to the CPU 51. The input signal processing unit 55 realizes the functions of the operation units 11 and 21 described earlier. As the input device 55a, it is possible to use a pointing device such as a mouse, a touch panel, a touch pad, or a trackball, a keyboard, a remote controller, button switches, or the like. A plurality of types of input device may be connected to the computer 50.

The medium reader 56 is a reader apparatus that reads programs and data recorded on a recording medium 56a. As examples, it is possible to use a magnetic disk, an optical disc, a magneto-optical (MO) disc, or a semiconductor memory as the recording medium 56a. Magnetic disks include flexible disks (FD) and HDD. Optical discs include compact discs (CDs) and digital versatile discs (DVDs).

As one example, the medium reader 56 copies programs and data read from the recording medium 56a into other recording media such as the RAM 52 and the HDD 53. The program that has been read out is executed by the CPU 51, for example. Note that the recording medium 56a may be a portable recording medium and may be used to distribute the program and/or data. The recording medium 56a and the HDD 53 are sometimes referred to as "computer-readable recording media".

The communication interface 57 is an interface that is connected to a network 57a and performs communication with another information processing apparatus via the network 57a. The communication interface 57 may be a wired communication interface connected by a cable to a communication device, such as a switch, or may be a wireless communication interface connected by a wireless link to a base station.

Note that as described earlier, the processing content of the management units 12, 22, and 31, and the first management unit 41a described above may be realized by having the computer 50 execute a program.

The program may be recorded on a computer-readable recording medium (for example, the recording medium 56a). As examples, a magnetic disk, an optical disc, a magneto-optical disc, and a semiconductor memory may be used as the recording medium. Magnetic disks include FD and HDD. Optical discs include CD, CD-R (Recordable) and CD-RW (Rewritable), DVD, and DVD-R/RW. The program may be distributed by being recorded on a portable recording medium. In this case, the program may be executed after being copied from the portable recording medium onto another recording medium (for example, the HDD 53).

Although optimization apparatuses, control methods for optimization apparatuses, and control programs for optimization apparatuses according to above embodiments have been described, the configurations described above are mere examples to which the embodiments are not limited.

According to the present embodiments, it is possible to automatically set appropriate operating conditions in keeping with a problem without the user having to set optimal operating conditions for each type of problem.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus comprising: a computation circuit that searches for a ground state of an Ising model by using a simulated annealing or an exchange Monte Carlo method; and
a processor that converts a problem inputted from an input device to the Ising model, inputs the Ising model and initial operating conditions which include values of parameters of the simulated annealing or the exchange Monte Carlo method into the computation circuit, and causes the computation circuit to search for the ground state using the initial operating conditions, produces overall operating conditions by changing at least one of the values of the parameters included in the initial operating conditions when a result of the computation circuit searching for the ground state using the initial operating conditions changes while search for the ground state is executed a predetermined number of times, and causes the computation circuit to search for the ground state using the overall operating conditions.

2. The optimization apparatus according to claim 1, wherein
the computation circuit includes a plurality of first computation circuits, and
the processor inputs respectively different initial operating conditions into each of the plurality of first computation circuits and exchanges the initial operating conditions inputted into a second computation circuit and a third computation circuit, out of the plurality of first computation circuits, in accordance with an exchange probability based on results of searches for the ground state by the plurality of first computation circuits.

3. The optimization apparatus according to claim 1, wherein
the computation circuit includes a plurality of first computation circuits, and
the processor inputs respectively different initial operating conditions into each of the plurality of first computation circuits and inputs respectively different overall operating conditions, which have been produced by changing the initial operating conditions, into each of the plurality of first computation circuits based on results of searches for the ground state by the plurality of first computation circuits.

4. The optimization apparatus according claim 1, wherein the processor includes:
a first management unit that converts the problem to the Ising model; and
a second management unit that is implemented in a computation apparatus in which the computation circuit is provided and that converts the initial operating conditions to the overall operating conditions.

5. The optimization apparatus according to claim 1, wherein the processor holds the result of the computation circuit searching for the ground state.

6. The optimization apparatus according to claim 1, wherein the parameters are first parameters used for the simulated annealing or second parameters used for the exchange Monte Carlo method,
the first parameters including at least one of an initial temperature, a final temperature and a cooling rate,
the second parameters including at least one of a highest temperature, a lowest temperature, a temperature interval and a number of replicas.

7. The optimization apparatus according to claim 1, wherein the processor produces the overall operating conditions when an energy of the Ising model or a variation in the energy is larger than a predetermine value after the search for the ground state is executed the predetermined number of times.

8. A control method for an optimization apparatus, the method comprising:
converting, by a processor of an optimization apparatus, a problem that has been inputted from an input device into an Ising model;
inputting, by the processor, the Ising model and initial operating conditions which include values of parameters of a simulated annealing or an exchange Monte Carlo method into a computation circuit of the optimization apparatus, the computation circuit searching for a ground state of the Ising model by using the simulated annealing or the exchange Monte Carlo method;

causing, by the processor, the computation circuit to search for the ground state using the initial operating conditions;

producing, by the processor, overall operating conditions by changing at least one of the values of the parameters included in the initial operating conditions when a result of the computation circuit searching for the ground state using the initial operating conditions changes while search for the ground state is executed a predetermined number of times; and causing, by the processor, the computation circuit to search for the ground state using the overall operating conditions.

9. The control method for the optimization apparatus according to claim 8, wherein the processor holds the result of the computation circuit searching for the ground state.

10. The control method for the optimization apparatus according to claim 8, wherein the parameters are first parameters used for the simulated annealing or second parameters used for the exchange Monte Carlo method,
the first parameters including at least one of an initial temperature, a final temperature and a cooling rate,
the second parameters including at least one of a highest temperature, a lowest temperature, a temperature interval and a number of replicas.

11. The control method for the optimization apparatus according to claim 8, wherein the processor produces the overall operating conditions when an energy of the Ising model or a variation in the energy is larger than a predetermine value after the search for the ground state is executed the predetermined number of times.

12. A non-transitory computer-readable recording medium storing therein a computer program that causes a processor of an optimization apparatus to execute a process comprising:
converting a problem that has been inputted from an input device into an Ising model;
inputting the Ising model and initial operating conditions which include values of parameters of a simulated annealing or an exchange Monte Carlo method into a computation circuit of the optimization apparatus, the computation circuit searching for a ground state of the Ising model by using the simulated annealing or the exchange Monte Carlo method;

causing the computation circuit to search for the ground state using the initial operating conditions;

producing overall operating conditions by changing at least one of the values of the parameters included in the initial operating conditions when a result of the computation circuit searching for the ground state using the initial operating conditions changes while search for the ground state is executed a predetermined number of times; and causing the computation circuit to search for the ground state using the overall operating conditions.

13. The non-transitory computer-readable recording medium according to claim 12, wherein the process further includes holding the result of the computation circuit searching for the ground state.

14. The non-transitory computer-readable recording medium according to claim 12, wherein the parameters are first parameters used for the simulated annealing or second parameters used for the exchange Monte Carlo method,
the first parameters including at least one of an initial temperature, a final temperature and a cooling rate,
the second parameters including at least one of a highest temperature, a lowest temperature, a temperature interval and a number of replicas.

15. The non-transitory computer-readable recording medium according to claim 12, wherein the process further includes:
producing the overall operating conditions when an energy of the Ising model or a variation in the energy is larger than a predetermine value after the search for the ground state is executed the predetermined number of times.

* * * * *